United States Patent [19]

Stark

[11] 4,401,400
[45] Aug. 30, 1983

[54] MACHINE TOOL

[76] Inventor: Gerhard Stark, Beethovenstr. 21, 7312 Notzingen, Fed. Rep. of Germany

[21] Appl. No.: 188,596

[22] Filed: Sep. 19, 1980

[30] Foreign Application Priority Data

Oct. 9, 1979 [DE] Fed. Rep. of Germany ....... 2940822

[51] Int. Cl.³ ............... B23G 11/00; B23Q 3/00; B23Q 7/00
[52] U.S. Cl. .......................................... 408/71; 269/30
[58] Field of Search ............. 408/34, 62, 67, 69, 408/71; 29/564, 563, 33 P; 269/30, 55, 56, 71, 73; 414/749, 744 R; 409/219

[56] References Cited

U.S. PATENT DOCUMENTS

| 1,138,515 | 5/1916 | Todd et al. | 409/219 |
| 3,540,318 | 11/1970 | Greenberg | 408/67 |
| 3,825,245 | 7/1974 | Osburn et al. | 269/30 |
| 3,910,420 | 10/1975 | Rich | 414/749 |
| 3,986,617 | 10/1976 | Blomquist | 408/71 |
| 4,075,753 | 2/1978 | Gusching et al. | 408/71 |
| 4,090,287 | 5/1978 | Selander | 408/71 |
| 4,133,423 | 1/1979 | Zankl | 414/749 |

FOREIGN PATENT DOCUMENTS 2833145  7/1978  Fed. Rep. of Germany ........ 408/71

Primary Examiner—Robert E. Garrett
Assistant Examiner—Paul M. Heyrana, Sr.
Attorney, Agent, or Firm—Michael J. Striker

[57] ABSTRACT

A mechine tool includes a movable work table assembled of a base part defining first clamping surface and of an exchangeable table part defining a second clamping surface levelled with the first one and being movable in guideways on the base part; a pallet changer having a rotary table provided with guideways aligned with the guideways on the work table unit supports pallets in the form of the exchangeable table part so that a workpiece can be clamped on one pallet while another workpiece on a second pallet is being operated in the machine.

7 Claims, 3 Drawing Figures

MACHINE TOOL

BACKGROUND OF THE INVENTION

This invention relates generally to machine tools, and in particular to a machine tool having a movable work table and means for moving a tool relative to the work table.

In vertical machine tools such as drilling machines or turret-head automatic boring mills, relatively large work tables (coordinate tables) are employed in order to support a large and bulky workpiece for its machining, or a plurality of smaller workpieces in order to achieve longer operational or running times for an automatic cycle thus enabling the operator to attend to several machine tools. The clamping of workpieces in the machine tool normally requires considerable time and reduces the actual working time of the expensive machine tool. Attempts have already been made with a separate pallet changing system to make the clamping time compatible with the proper machining time. The known pallet changing systems, however, are expensive, require considerable space and energy and are costly to manufacture.

SUMMARY OF THE INVENTION

It is therefore a general object of the present invention to overcome the aforementioned disadvantages.

More particularly, it is an object of the invention to provide an improved machine tool which substantially reduces non-operative times.

Another object of this invention is to provide such an improved machine tool which employs a work table having a large supporting area at disposal.

In keeping with these objects, and others which will become apparent hereafter, one feature of the invention resides in forming the work table of a base part and an exchangeable part which is movable relative to the base part and serves as a platform or pallet for a pallet changer. In other words, the exchangeable part of the work table is a pallet for a pallet changer on the one hand, and in its fixed or clamped condition when the pallet changer is out of operation forms with the base part of the work table an enlarged clamping surface of the work table for supporting large size workpieces, on the other hand. In this manner, the base part and the exchangeable part form together a large area work or coordinate table. Smaller workpieces are clamped on the exchangeable part only and fed to the machine and discharged therefrom via the pallet changer; consequently, the clamping time coincides with the machining time and in this manner the non-operative times of the machine are considerably reduced. The supporting surfaces of the base part and of the exchangeable part of the work table are flush with one another and in this common level are movable relative to each other. The exchangeable part of the work table is movable to and fro by a power drive, such as a hydraulic or pneumatic working cylinder or power-driven threaded spindle. The power drives are arranged either on the base part of the work table or on the pallet changer and include a catch or entrainment means engageable with the exchangeable table part. A power drive for displacing the exchangeable table part can be also employed as the main power drive for the whole work or coordinate table unit. For workpieces which require the large supporting area of the coordinate or work table, the exchangeable table part is arrested in its normal position and the pallet changer is made inoperative.

The pallet changer includes a rotary table provided with guideways for the pallets. The guideways of the pallet changer are aligned with the guideways of the work table so that the exchangeable part is displaceable by the power drives from the guideways of the rotary table into the guideways of the work table, and vice versa.

During rotation of the rotary table the pallets are automatically engaged with or disengaged from the entrainment piece of the power drive.

The following operational possibilities in the machine tool of this invention are applicable:
1. Workpieces which due to their configuration or weight are difficult to be clamped or require an excessive clamping time, are clamped on the pallets and fed on the work table via the pallet changer.
2. Manageable and quickly clampable workpieces can be fixed immediately on the base part of the work table.
3. Workpieces which are to be machined from several sides can be fixed alternately in two clamping positions on the base part and on the exchangeable part of the work table. For example, if a casting which is difficult and time-consuming for clamping is fed on the work table via the pallet changer into its first processing position while the first machining operation is carried out whereupon the operator clamps the same into a second clamping device on the base work table part. In the new clamping position are carried out all remaining machining operations. Upon feeding a new casting from the pallet changer there take place always two workpieces on the work table unit so that in one working cycle completed workpiece is discharged while the unfinished workpiece is reclamped and a new blank is fed via the pallet changer. As a result, the conventional intermediate storing, transportation and intermediate check can be avoided.
4. Large size workpieces are clamped on the large clamping surface resulting from the combined application of the base part and of the exchange part of the work table whereby the pallet changer is made inoperative.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF PREFERRED EMBODIMENTS

Figure 1:
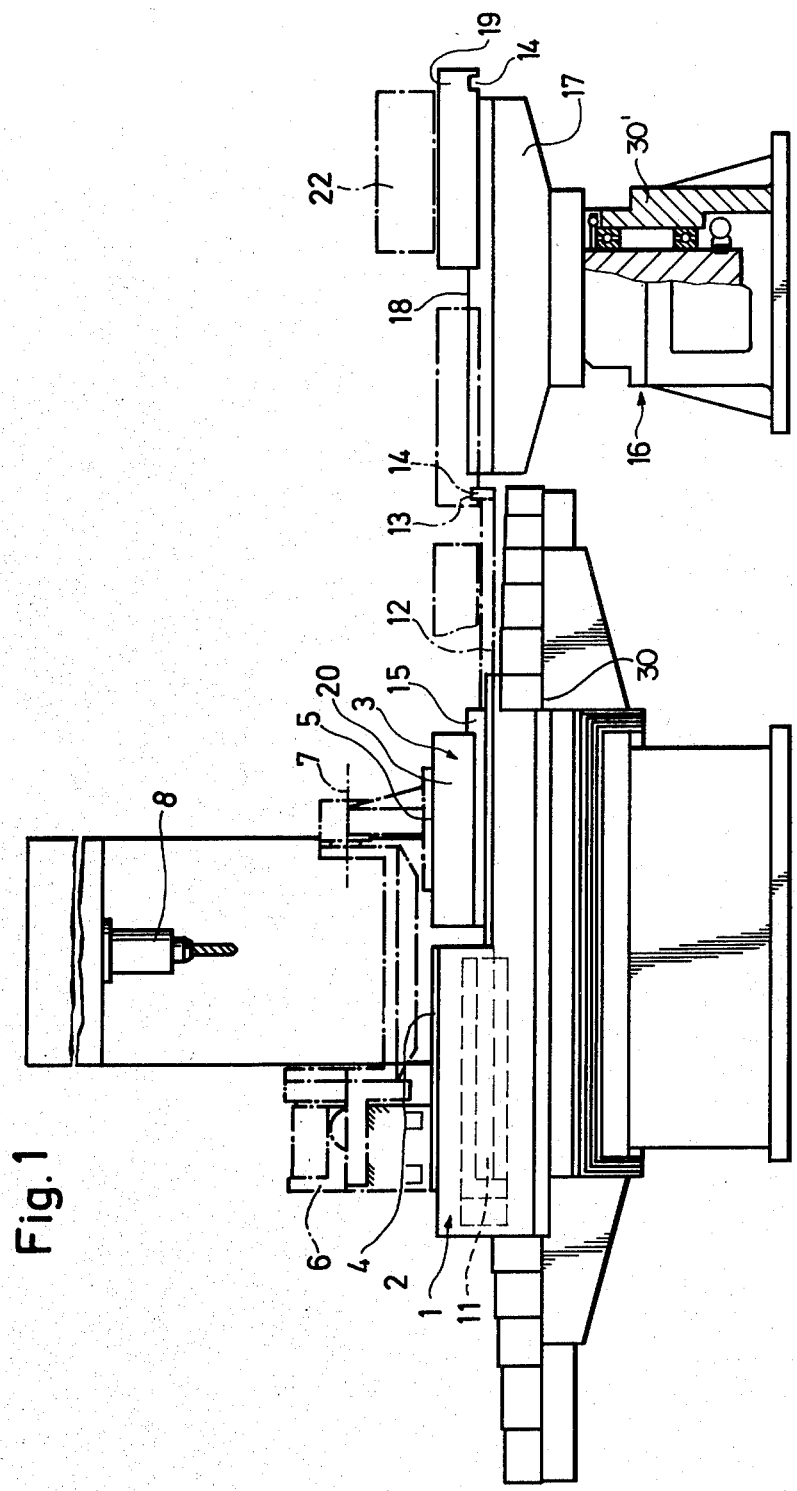
FIG. 1 is a front view of a schematically illustrated machine tool of this invention in combination with a pallet changer, shown in a position for machining large size workpieces.
Figure 2:
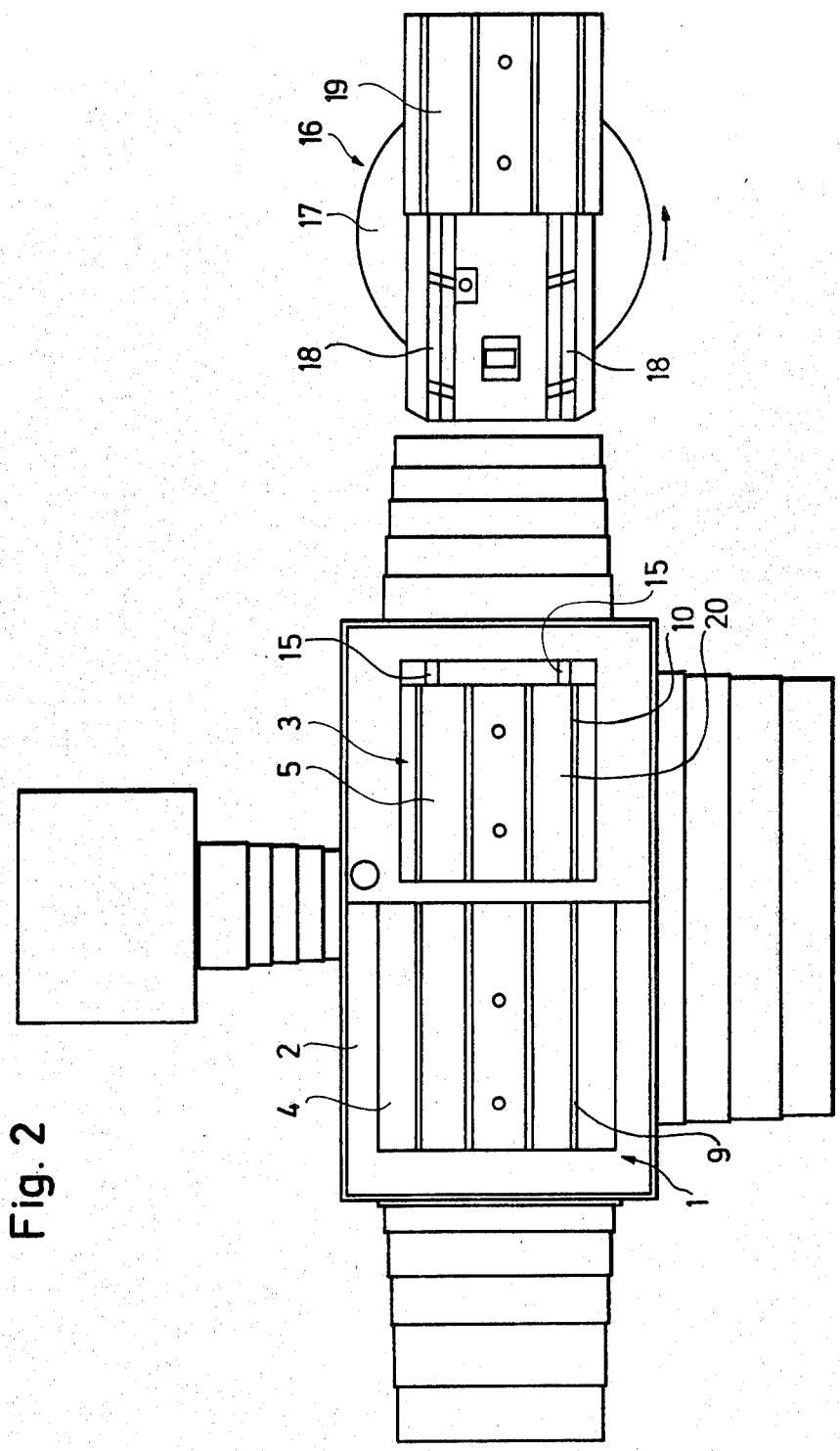
FIG. 2 is a plan view of the combination of FIG. 1.
Figure 3:
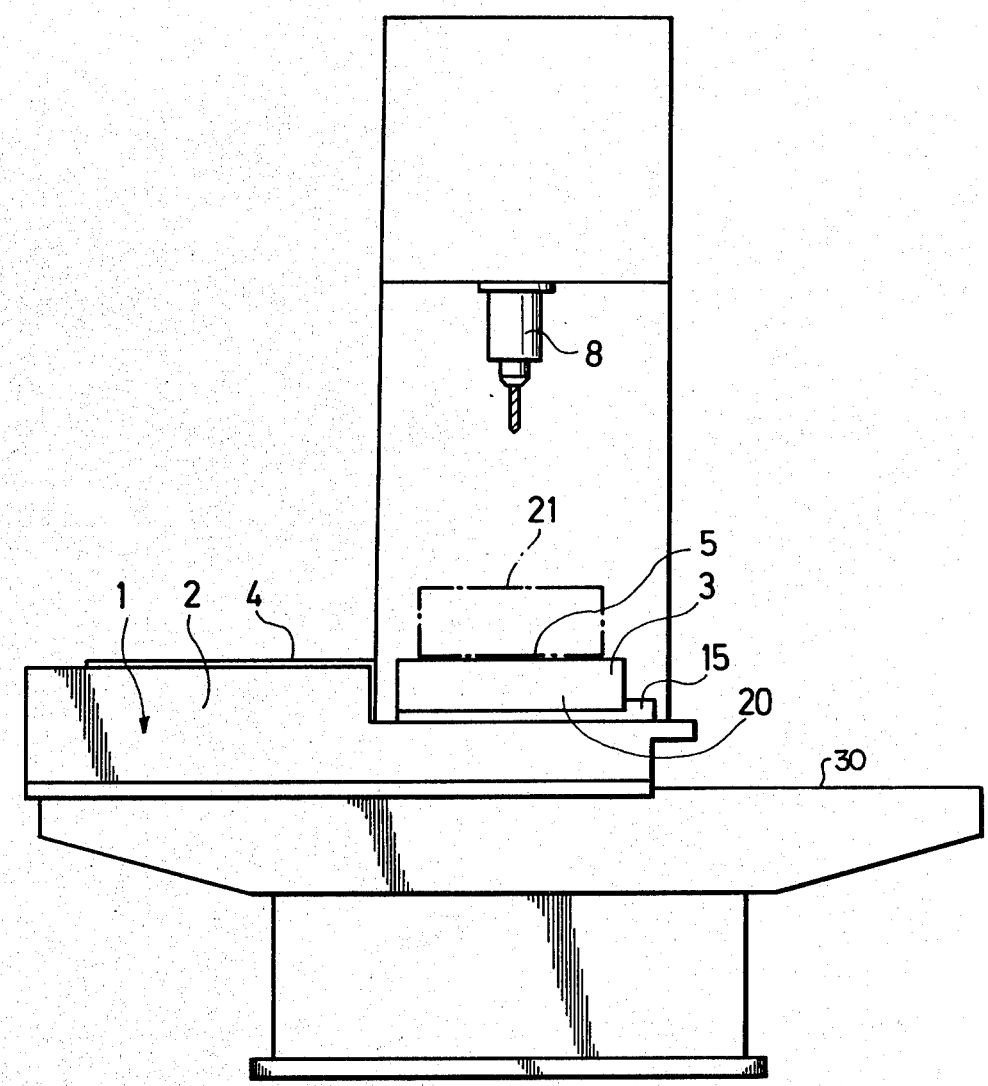
FIG. 3 is a front view of a machine tool of this invention without the use of a separate pallet changer.

The machine tool of this invention includes a work table unit 1 constructed as a coordinate table and assembled of a base part 2 and of an exchangeable part 3. The table unit 1 is movable along coordinates on a horizontal top surface of a stationary stand 30. Both table surfaces 4 and 5 of the base part 2 and respectively the exchangeable part 3 are arranged in one horizontal plane. The exchangeable part 3 is arrestable in its normal position I which is illustrated in FIG. 1 so that a large clamping surface for holding large workpieces results from the combined table surfaces 4 and 5. As indicated by dash and dot lines in FIG. 1, a rotary switching table 6 including holding means for the workpiece is mounted on the table surfaces 4 and 5. The switching table is rotatable about a horizontal axis 7 and has a graduation of for example 4×90° for machining four sides of the workpiece. The clamped workpiece is processed by a tool 8 fed in vertical direction perpendicularly to the table surfaces 4 and 5. In the normal position of the exchangeable table part 3 the T-shaped grooves or guideways 9 and 10 of the base table part 2 and of the exchangeable table part 3 are aligned so that oversize and bulky workpieces can be held on the large clamping surface resulting from the combined table surfaces 4 and 5.

The exchangeable table part 3 is movable to and fro relative to the base table part 2 by means of a power drive 11 arranged in the base part 2. The power drive 11 can be preferably constituted by a hydraulic or pneumatic working cylinder the piston rod 12 of which is provided on its free end with a catch or entrainment piece 13 which is engageable with a groove 14 on the lower side of the exchangeable table part 3. The exchangeable table part is slidably guided in guideways 15. The sliding movement of the part 3 is indexed and in certain positions, particularly in the normal position it can be arrested, for example it can be clamped by clamp springs and released hydraulically.

An associated pallet changer 16 is formed with a rotary table 17 mounted on a stationary stand 30' and switchable by about 180°. The upper surface of the rotary table 17 is provided with guideways 18 corresponding to guideways 15 of the work table unit 1. Inasmuch as the level of the guideways 18 corresponds to the level of the guideways 15, the exchangeable table part 3 can be displaced by the power drive 11 from its normal position I on the work table unit 1 into guideways 18 of the rotary table of the pallet changer 16 and upon rotating the table 17 about 180° the new pallet 19 is fed on the table unit 1.

The pallet changer 16 in this example operates with two platforms or pallets 19 and 20 forming respectively the exchangeable table parts 3. For smaller workpieces which can be sufficiently clamped on the surface 5 of the exchangeable table part, the pallet changer 16 is always employed so that the workpieces be simultaneously released or clamped in a time period which coincides with the machining time for another workpiece.

When using the pallet changer 16, the next workpiece 22 to be processed is being clamped to the pallet 19 on the rotary table 17 while the preceding workpiece on the pallet 20 is operated by the tool 8. Upon finishing the machining operation on the workpiece 21, the whole work table unit 1 is displaced into a transit position II which in the example according to FIG. 1 is identical with the right-hand extremity of the drilling machine. In this transit position the power drive 11 which engages with its entrainment piece or catch 13 an annular groove 14 in the pallet 20, displaces the latter together with the workpiece 21 from the guideways 15 into the guideways 18 of the rotary table 17 (position III). Thereupon rotary table 17 rotates about 180° so that the next pallet 19 with the workpiece 22 with its annular groove 14 the catch 13 of the power drive 11 and subsequently the piston rod 12 of the latter draws the pallet 19 towards the base table part 2. According to a predetermined indexing position the pallet 19 is arrested in the guideways 15, the whole work table unit 1 returns in its corresponding working position and the machining of the workpiece 22 is initiated.

In another mode of operation, workpieces the size of which can be accommodated on the table surface 5 are fed via the pallet changer 16 by means of the exchangeable table part 3. At the same time, the surface 4 of the base table part 2 is employed for releasing and clamping the semifinished workpiece for machining in another position or for fixing another workpiece of corresponding size whereby a clamping device can be either directly mounted on the table surface 4 or on a rotary switching table 6 as indicated in FIG. 1 can be employed but without holding means. In this manner, both table surfaces 4 and 5 of the work table unit 1 are fully utilized in the course of one working cycle for different operations whereby the clamping time for the workpiece on the surface 5 of the exchangeable table part 3 due to the application of the pallet changer 16 is coincident with the actual processing time whereas the clamping time for the workpiece on the surface 4 of the base table part 2 is to be added to the processing time of the workpiece concerned, inasmuch as the machine has to wait until this workpiece is clamped or released. A casting or workpiece will take less time-consuming adjustments if preferably clamped on the pallet, whereas a preliminary processed workpiece can be fixed in a relatively short time on the table surface 4.

It will be understood that each of the elements described above, or two or more together, may also find a useful application in other types of constructions differing from the types described above.

While the invention has been illustrated and described as embodied in a turning machine tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A machine tool comprising a coordinate work table unit; means supporting said table unit for movement in a horizontal plane; means for moving a processing tool in vertical directions relative to said table unit; said table unit including a fixed base part and guiding means for engaging and guiding an exchangeable part which is movable relative to the base part, said base part and said exchangeable part having each an upper surface levelled in one plane for supporting and clamping a workpiece, a pallet changer arranged at a fixed position relative to said work table unit, said pallet changer being provided with additional guiding means arranged at the level of said first mentioned guiding means for engaging and guiding at least two exchangeable parts, and means disconnectably engaging and displacing an exchangeable part between said work table unit and said pallet changer and vice versa.

2. A machine tool as defined in claim 1, wherein said displacing means includes a reciprocating power drive mounted on said base part and including means for disconnectably engaging an exchangeable part.

3. A machine tool as defined in claim 1, wherein said engaging and displacing means are arranged in said base part of the table unit.

4. A machine tool as defined in claim 1, wherein said clamping upper surfaces of said base part and of said exchangeable part are provided respectively with aligned T-shaped grooves.

5. A machine tool as defined in claim 1, further including means for arresting said exchangeable part in a normal working position on said table unit in the range of said processing tool.

6. A machine as defined in claim 1, said pallet changer having a rotary table with means for exchangeably supporting pallets in the form of said exchangeable table part.

7. A machine tool as defined in claim 6, wherein said displacing means includes a power driven element provided with a catch member and said exchangeable table part being provided with annular grooves for engaging or disengaging said catch member during rotation of said rotary table of said pallet changer.

* * * * *